(No Model.)
F. BURGER & H. M. WILLIAMS.
BUTTER CAKE AND MEANS FOR MAKING SAME.
No. 602,124. Patented Apr. 12, 1898.
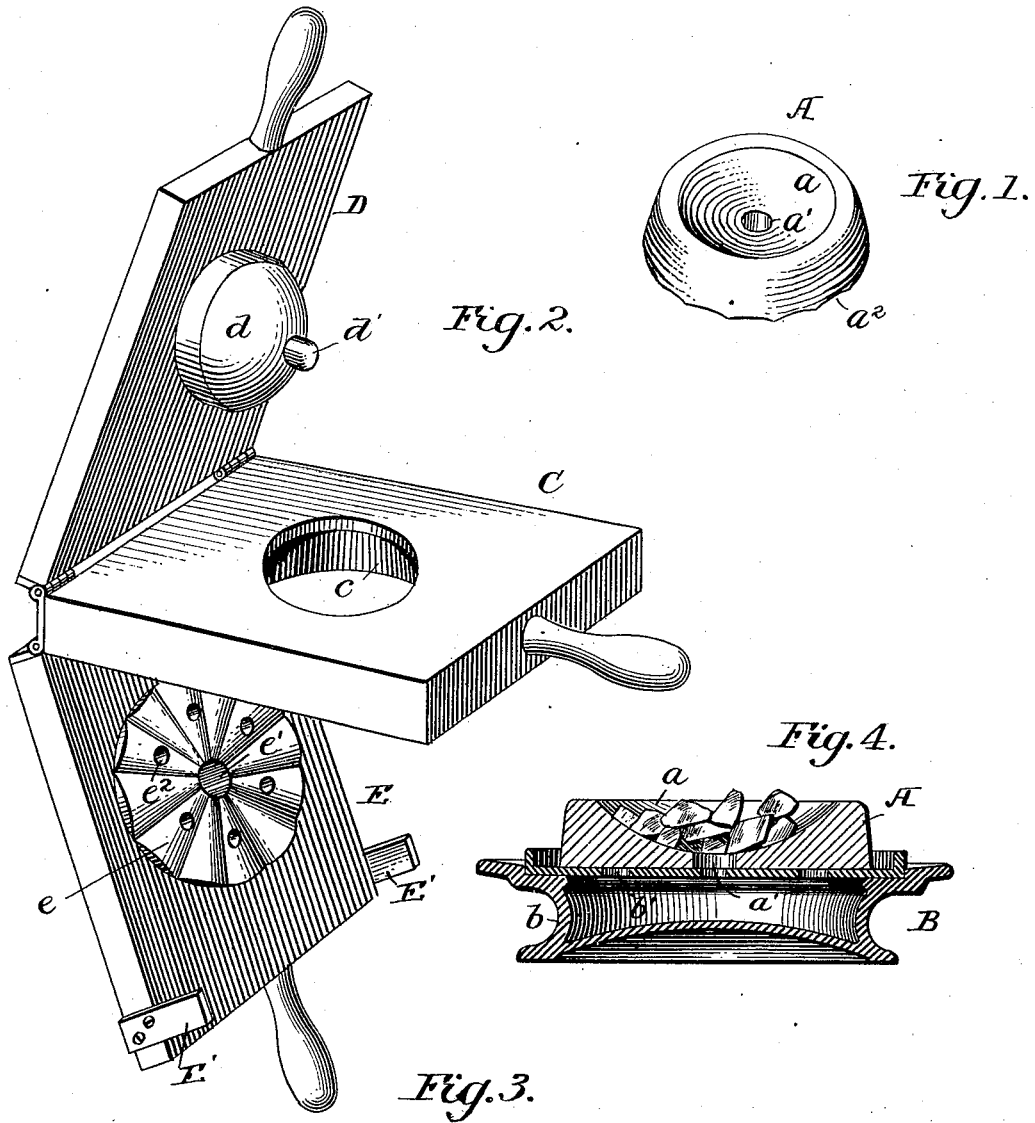
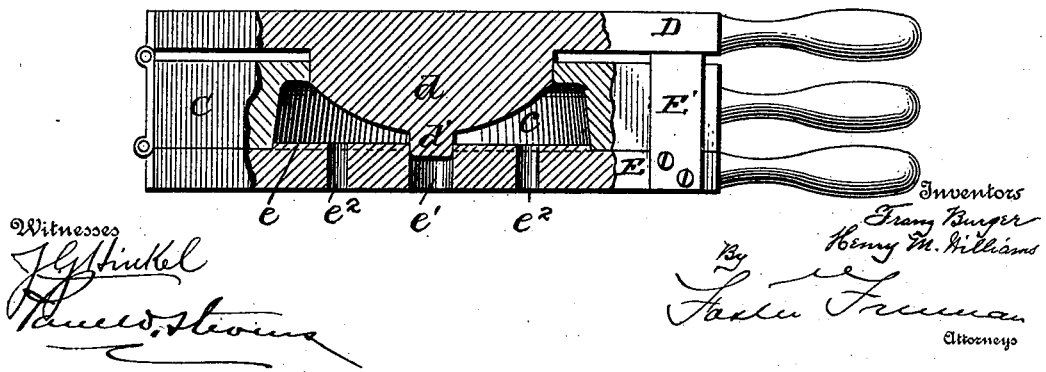

UNITED STATES PATENT OFFICE.

FRANZ BURGER AND HENRY M. WILLIAMS, OF FORT WAYNE, INDIANA; SAID BURGER ASSIGNOR OF ONE-HALF OF HIS RIGHT TO SAID WILLIAMS.

BUTTER CAKE AND MEANS FOR MAKING SAME.

SPECIFICATION forming part of Letters Patent No. 602,124, dated April 12, 1898.

Application filed August 17, 1897. Serial No. 648,596. (No specimens.)

*To all whom it may concern:*

Be it known that we, FRANZ BURGER and HENRY M. WILLIAMS, citizens of the United States, residing at Fort Wayne, in the county of Allen and State of Indiana, have invented certain new and useful Improvements in Butter Cakes and Means for Making the Same, of which the following is a specification.

This invention relates to an improved butter cake and means for making the same, and has for its objects to provide a butter cake which is well adapted for use and preservation and to provide means for making the same; and to these ends the invention consists in the butter cake and the device for making the same, substantially as hereinafter more particularly pointed out.

Referring to the accompanying drawings, Figure 1 is a perspective view of one embodiment of the butter cake. Fig. 2 is a perspective view of the device for making the same, the parts being distended. Fig. 3 is a longitudinal vertical section, the parts being closed; and Fig. 4 is a sectional view of a butter-dish, showing the butter cake in use.

Butter as at present served, especially in warm weather, is often supplied with ice for the purpose of keeping it hard and cool, and this ice is usually placed upon the butter, and the result generally is that it slides off from the butter and finally rests upon one side of the cake, making an unsightly appearance and failing to preserve the butter as intended. In order to overcome these defects by the present invention, the butter is molded into a cake of such a shape that there will be a hole or dish-like cavity on its upper surface, forming a receptacle for the ice, and preferably a hole through the center of the cake, permitting the water from the melted ice to pass through the cake. In this way the whole butter cake is preserved cool and solid with a relatively small quantity of ice. The cool water from the ice passing through the opening also aids in preserving the cake, and the under side of the cake is preferably corrugated, so that the water may run off or percolate through these corrugations and still further tend to preserve the cake.

In the drawings, the cake A is shown as round on its upper surface, although of course its outer surface may be of any desired contour, while its top surface is provided with a depression $a$ to receive the ice, and extending from this depression is an opening $a'$ through the cake, while the under side is preferably provided with radial corrugations or channels $a^2$. This cake, formed substantially as indicated, is well adapted to be received on a butter-dish B, as indicated in Fig. 4, and this dish may have a receptacle $b$ for the water, and there is preferably an opening $b'$ through the top of the dish, corresponding with the opening $a'$ in the butter cake. Other openings may be formed in this portion of the dish or it may be otherwise made, that forming no part of the present invention.

In order to readily form the butter cake above described, a mold is provided substantially such as is illustrated in Figs. 2 and 3. This mold is made of three parts C D E, hinged together at one end and each provided with a suitable handle for purposes of manipulation. The central portion, C, as shown, is made of a block having a central opening $c$, corresponding substantially with the outline of the butter cake, and this forms the body of the mold. The part D is provided with a convex central portion $d$, having a projecting pin $d'$, adapted to enter the body portion C and form a concave receptacle and opening in the butter cake. The portion E of the mold is provided with a corrugated central portion $e$, corresponding to the bottom of the butter cake, and with a central opening $e'$, corresponding to the pin $d'$. In the portion $e$ there are preferably a number of holes $e^2$, arranged substantially as indicated. Connected to this bottom portion E are the projections E', serving as guides for the parts of the mold.

With this construction the operation of the mold will be readily understood. The parts are separated, and a sufficient quantity of butter is placed in the central opening of the body portion C and the part D brought into alinement with said part C, forcing the butter into the central opening $c$ and causing it to fill the opening and to be properly molded. Then the portion D is brought down, the convex central portion $d$ enters the opening $c$, forcing the butter to assume a convex shape on its upper portion, and the pin $d'$ enters the openings $e'$ in the lower portion, forming a central hole in the butter cake. As it is impossible to place the exact amount of butter in the mold to fill every cavity, the holes $e^2$ are provided in the bottom portion, through which the excess of material is forced when pressing the upper portion D down. When the molding is completed, the upper portion D will rest against the projections $E'$, which extend slightly above the central portion C when the parts are in the position shown in Fig. 3, and then when it is desired to remove the butter cake the portion E is extended to the position shown in Fig. 2 and the upper portion D forced downward slightly against the upper face of the portion C, forcing the butter cake out of the mold.

While this invention is described in connection with a butter cake, of course it can be used for other materials where it is desired to form them in substantially the same manner.

What is claimed is—

1. As a new article of manufacture, a butter cake consisting of a lump of butter having a recess at the top for the purpose of receiving ice and a central opening to permit the escape of the melted water.

2. As a new article of manufacture, a butter cake consisting of a lump of butter having a recess at the top for the purpose of receiving ice, a central opening to permit the escape of the melted water, and a corrugated bottom surface.

3. A mold comprising three parts hinged together at one side and having handles, the central portion provided with a central opening, the upper portion provided with a convex projection and pin, and the lower portion provided with a central opening to receive the pin, substantially as described.

4. A mold comprising three parts hinged together at one side and having handles, the central portion provided with a central opening, the upper portion provided with a convex projection and pin, and the lower portion provided with a central opening to receive the pin and projections $E'$ extending from the side above the central portion, substantially as described.

In testimony whereof we have signed our names to this specification in the presence of two subscribing witnesses.

FRANZ BURGER.
HENRY M. WILLIAMS.

Witnesses:
GEO. D. CRANE,
J. BURGER.